J. W. BRUNSKILL.
CHECK VALVE.
APPLICATION FILED NOV. 30, 1914.
1,177,009.
Patented Mar. 28, 1916.
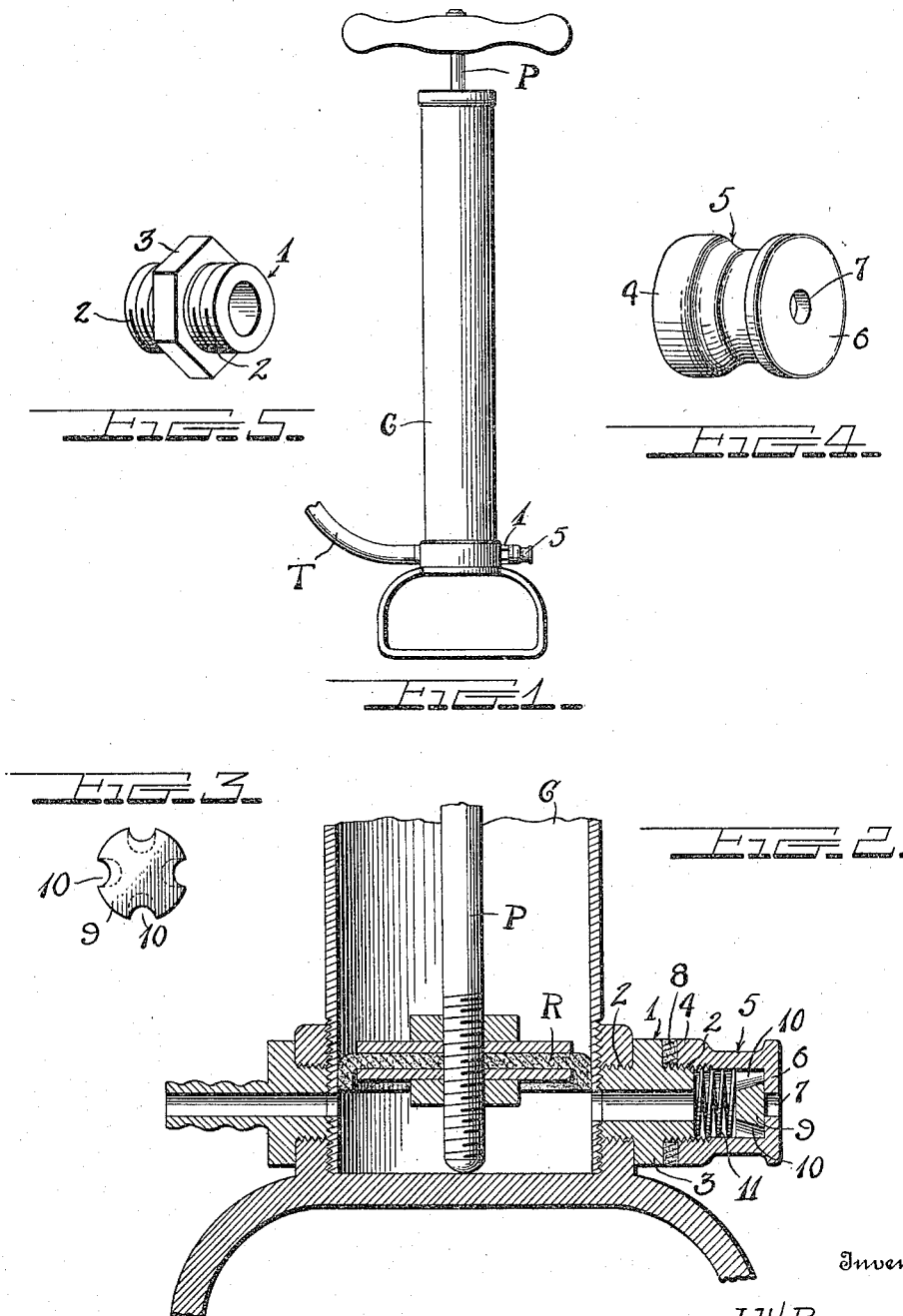
Witnesses
Edwin R. Hunt.
C. Munker
Inventor
J. W. Brunskill
By H. A. Wilson & Co.
Attorneys

UNITED STATES PATENT OFFICE.

JAMES W. BRUNSKILL, OF DUBUQUE, IOWA.

CHECK-VALVE.

1,177,009.   Specification of Letters Patent.   Patented Mar. 28, 1916.

Application filed November 30, 1914. Serial No. 874,771.

*To all whom it may concern:*

Be it known that I, JAMES W. BRUNSKILL, a citizen of the United States, residing at Dubuque, in the county of Dubuque and State of Iowa, have invented certain new and useful Improvements in Check-Valves; and I do declare the following to be a full, clear, and exact description of the invention, such as will enable others skilled in the art to which it appertains to make and use the same.

My invention relates to improvements in check valves and more particularly to those designed for use in connection with air pumps.

The object of the invention is to provide an extremely simple check valve which may be readily applied to the cylinder of an automobile or bicycle pump, thereby preventing unnecessary wear of the flexible pistons in such pumps, since with the present day construction, these flexible pistons, or rather flexible piston rings must contract upon the outward movements of the piston, to allow air to enter the lower end of the cylinder. On the other hand, when the piston is forced downwardly the flexible ring must expand and contact with the cylinder. This inward and outward movement has been found to unnecessarily wear the piston ring, and to likewise cause the flexible tube leading from the pump, to become worn by expansion and contraction as the piston is reciprocated. By the provision of an inwardly opening check valve for allowing air to enter the lower end of the cylinder, however, the flexible piston ring need not contract, nor is the suction great enough within the cylinder to contract the flexible tube.

In applying the invention to use, I employ certain novel features of construction and combination herein described and claimed and shown in the drawings wherein:

Figure 1 is a side elevation of an air pump equipped with the invention; Fig. 2 is an enlarged vertical section through the lower end of the pump and through the valve; Fig. 3 is a perspective of the valve disk employed; Fig. 4 is a similar view of the cylinder; and Fig. 5 is a perspective view of the pump attaching member.

In these drawings forming a part of this application, the improved valve is shown as comprising a tubular attaching member 1 which is provided with external screw threads 2 on its inner and outer ends, and with a polygonal enlargement 3 at its center. Threaded upon the outer end of the tubular member 1, is the open end 4 of a valve casing 5, the latter being of cylindrical formation and having its other end closed by an end wall 6 having a central opening 7, as shown. A gasket 8 is interposed between the end 4 of the cylinder 5 and the enlargement 3, said end 4 being increased in diameter for the purpose of forming an enlarged area upon which the gasket may bear.

Slidably mounted within the cylinder 5 is a valve disk 9 whose peripheral edge is provided with a number of transverse grooves 10, said notches increasing in depth from one side of the disk to the other side thereof as clearly seen in Figs. 2 and 3. The disk 9 is normally held in contact with the end wall 6 to close the opening therein, by a coiled spring 11 which is located within the cylinder 5 and bears at its opposite ends against the end of the attaching member 1 and against said disk.

It is important that the grooves 10 should increase in depth from the outer side of the disk to the inner side thereof, since by such construction all air drawn inwardly through said notches, by means to be described, is directed into the bore of the attaching member 1.

Furthermore, it will be observed that the outer end of the coil spring 11 crosses the inner ends of the grooves 10, thus obstructing such ends to a noticeable degree. By increasing the depth of the grooves from their outer to their inner ends, however, compensation is made for the obstruction offered by the spring, this being particularly advantageous when the valve disk 9 moves inwardly and compresses the spring.

In applying the device to use, the free end of the attaching member 1 is threaded into an opening formed in the lower end of an upright pump cylinder C, in which a piston P is mounted for reciprocation, said piston having the usual flexible packing ring R, which, when no check valve is employed, is adapted to yield inwardly to allow air to enter the lower end of the cylinder, when the piston is retracted. When however, the piston is projected or forced downwardly this ring must again move outwardly into contact with the cylinder. This continual contracting and expanding of the ring R causes the same to be unnecessarily worn, while the suction created in the lower end of the cylinder causes the outlet tube T to expand and contract as the piston is reciprocated. This is due to the fact that air is not allowed to readily enter the cylinder.

By the provision of the improved check valve, however, air may easily flow into the lower end of the cylinder when the piston is raised, thereby preventing the tube from becoming worn by the creation of a partial vacuum, and also preventing the ring R from becoming worn by expansion and contraction, since this movement does not then take place.

From the foregoing description taken in connection with the accompanying drawings it will be seen that a very simple device has been provided, yet one which will increase the efficiency and life of any pump to which it is applied.

I claim:—

A valve comprising a cylindrical casing having in one end a central inlet opening and in its other end a central outlet opening, a valve disk in the cylinder whose center normally closes the inlet opening and whose peripheral edge is grooved transversely at intervals to allow for the passage of air, and a coil spring in the casing bearing at one end on the outlet end thereof and at its other end against the valve disk with its endmost convolution crossing the inner ends of the grooves in such disk, said grooves being increased in depth from their outer to their inner ends to compensate for the portions thereof obstructed by the spring.

In testimony whereof I have hereunto set my hand in presence of two subscribing witnesses.

JAMES W. BRUNSKILL.

Witnesses:
H. B. SPENSLEY,
J. R. WESTON.

Copies of this patent may be obtained for five cents each, by addressing the "Commissioner of Patents, Washington, D. C."